(12) United States Patent
Yang

(10) Patent No.: US 7,982,977 B2
(45) Date of Patent: Jul. 19, 2011

(54) IMAGING LENS ASSEMBLY HAVING MULTIPLE LENSES WITH POSITIVE AND NEGATIVE REFRACTIVE POWERS

(75) Inventor: Jin Oh Yang, Suwon-si (KR)

(73) Assignee: Microptics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/105,147

(22) Filed: Apr. 17, 2008

(65) Prior Publication Data

US 2009/0097135 A1   Apr. 16, 2009

(30) Foreign Application Priority Data

Oct. 10, 2007   (KR) ........................ 10-2007-0102157

(51) Int. Cl.
*G02B 9/34* (2006.01)

(52) U.S. Cl. ....................................... 359/773; 359/715

(58) Field of Classification Search .................. 359/773, 359/753, 715, 686
See application file for complete search history.

(56) References Cited

U.S. PATENT DOCUMENTS

| 7,355,801 B2* | 4/2008 | Chen et al. ..................... 359/773 |
| 7,535,659 B2* | 5/2009 | Sano .............................. 359/773 |
| 2007/0188890 A1* | 8/2007 | Jo et al. ......................... 359/773 |

* cited by examiner

*Primary Examiner* — Alicia M Harrington
(74) *Attorney, Agent, or Firm* — Frommer Lawrence & Haug LLP; Ronald R Santucci

(57) ABSTRACT

An imaging lens, which can be suitable for small-size information terminals, such as mobile phones equipped with cameras, or Personal Digital Assistants (PDAs). The imaging lens includes an iris, a first lens having a positive refractive power, a second lens, having a negative refractive power, a third lens having an aspherical shape and a positive refractive power, and a fourth lens having an aspherical shape and a negative refractive power.

2 Claims, 1 Drawing Sheet

IMAGING LENS ASSEMBLY HAVING MULTIPLE LENSES WITH POSITIVE AND NEGATIVE REFRACTIVE POWERS

BACKGROUND OF THE INVENTION

1. Field of the Invention

The present invention relates to an imaging lens, which can be suitably mounted in small-sized information terminals, such as mobile phones equipped with cameras or Personal Digital Assistants (PDAs).

2. Description of the Related Art

Recently, with the propagation of personal computers to general homes, a digital still camera (hereinafter referred to as a 'digital camera'), enabling image information to be input into a personal computer, has been rapidly popularized. Further, with the realization of high-functionality of mobile phones, a mobile phone equipped with a camera, in which a small-size imaging module is mounted, has also been rapidly popularized. In addition, in the case of other small-sized information terminals, such as PDAs, an information terminal equipped with an imaging module has been popularized.

In such an appliance equipped with an imaging function, an imaging device, such as a Charge Coupled Device (CCD) or a Complementary Metal Oxide Semiconductor (CMOS), is used. Recently, the size of this imaging device has been greatly reduced. Owing to the reduction in the size of an imaging device, in an imaging apparatus using an imaging device such as a CCD, the realization of a small size and a light weight are required for both the main body of the imaging apparatus and the lens mounted in the main body. Further, recently, imaging devices having a large number of pixels have been developed to realize high quality, so that high performance, such as high resolution or high contrast, is also required in a lens system.

As described above, for recent imaging devices, small size and high-pixel density have been realized, and thus high resolution and high structural compactness have been required for imaging lenses for digital cameras. Meanwhile, in the prior art, imaging lenses for small-sized information terminals, such as mobile phones equipped with cameras, are mainly required in order to realize low costs and structural compactness, but, recently, there is a tendency for the high-pixel density of imaging devices to be implemented in mobile phones equipped with cameras. For example, megapixel imaging devices having a number of pixels greater than a million pixels are utilized, and thus the necessity for high-performance imaging devices has increased. Due thereto, the development of various types of lenses in which costs, performance and compactness are considered together is required.

In order to meet such a necessity, a method of configuring a lens using, for example, three or four lens elements is considered to realize compactness and low costs, and a method of actively utilizing aspheric lenses is being considered to realize high performance.

Such aspheric lenses are advantageous in that they contribute to the realization of compactness and high performance, but are disadvantageous in that the manufacturing efficiency thereof may be decreased and the costs thereof may be increased.

Further, when aspheric lenses are actively used, there are problems in that the sensitivity of the lenses is increased, so that assembly efficiency is decreased, and thus productivity is deteriorated.

SUMMARY OF THE INVENTION

Accordingly, the present invention has been made keeping in mind the above problems occurring in the prior art, and an object of the present invention is to provide an imaging lens, in which the surface of a lens in a highly sensitive portion is formed as a spherical surface, rather than an aspherical surface, thus making it easier to produce an imaging lens through the improvement of assembly efficiency, and enhancing the yield of the imaging lens.

In order to accomplish the above object, the present invention provides an imaging lens, comprising an iris, a first lens, a second lens, a third lens, and fourth lens sequentially arranged in a direction from an object side, wherein the first lens is a positive lens having positive refractive power, the second lens is a negative lens having negative refractive power, the third lens is a positive lens, which has at least one surface formed in an aspherical shape and has positive refractive power, and the fourth lens is a negative lens, which has an image side surface formed in an aspherical shape and an object side surface formed in a spherical shape, and has negative refractive power, and wherein the imaging lens is configured to satisfy the following conditional expressions:

$$(r3+r4)/(r3-r4) > -0.7 \quad [1]$$

$$v1-v2 > 15.0 \quad [2]$$

$$v3-v2 > 15.0 \quad [3]$$

where r3 is a radius of curvature of an object side surface of the second lens, r4 is a radius of curvature of an image side surface of the second lens, and v1, v2 and v3 are Abbe constants of the first, second and third lenses, respectively.

Preferably, the imaging lens may be configured to satisfy the conditional expression:

$$0 > R_{3R} > R_{4F} \quad [4]$$

where $R_{3R}$ is a radius of curvature at a center of an image side surface of the third lens, and $R_{4F}$ is a radius of curvature at a center of an object side surface of the fourth lens.

Preferably, the imaging lens may be configured to satisfy the following conditional expression [5] for power of the first lens and to satisfy the following conditional expression [6] for dimensions of an entire imaging lens along an optical axis, $$0 < f1/f < 0.8 \quad [5]$$

$$TL/f < 1.7 \quad [6]$$

where f is a focal distance of the entire imaging lens, f1 is a focal distance of the first lens, and TL is a distance from an object side of the iris to an imaging surface.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
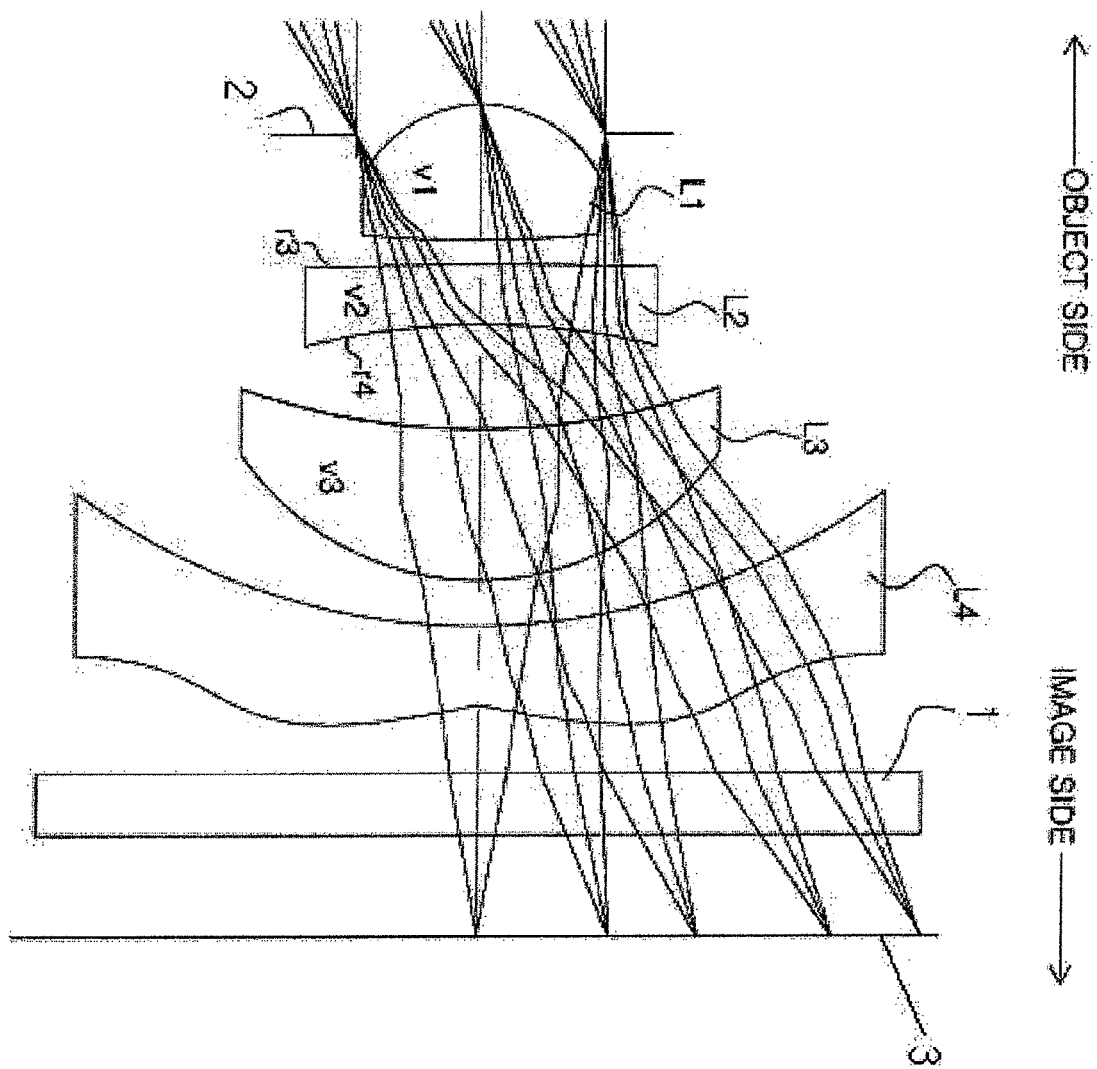
FIG. 1 is a sectional view showing the construction of an imaging lens according to an embodiment of the present invention.

Hereinafter, embodiments of the present invention will be described in detail with reference to the attached drawings.

An imaging lens according to the present invention sequentially includes an iris, a first lens, a second lens, a third lens, and a fourth lens in the direction from an object side to an image side. The first lens is a positive lens having positive refractive power, the second lens is a negative lens having negative refractive power, the third lens is a positive lens, which has at least one surface formed in an aspherical shape and has positive refractive power, and the fourth lens is a negative lens, which has an image side surface formed in an aspherical shape and an object side surface formed in a spherical shape, and has negative refractive power. The imaging lens is configured to satisfy the following conditional expressions, $$(r3+r4)/(r3-r4)>-0.7 \quad [1]$$

$$v1-v2>15.0 \quad [2]$$

$$v3-v2>15.0 \quad [3]$$

where r3 is the radius of curvature of the object side surface of the second lens, r4 is the radius of curvature of the image side surface of the second lens, and v1, v2 and v3 are Abbe constants of the first, second and third lenses, respectively.

Further, the imaging lens according to the present invention is configured to satisfy the following conditional expression, $$0>R_{3R}>R_{4F} \quad [4]$$

where $R_{3R}$ is the radius of curvature at the center of the image side surface of the third lens, and $R_{4F}$ is the radius of curvature at the center of the object side surface of the fourth lens.

Further, the imaging lens is configured to satisfy the following conditional expression [5] for the power of the first lens, and to satisfy the following conditional expression [6] for the dimensions of the entire lens along an optical axis, $$0<f1/f<0.8 \quad [5]$$

$$TL/f<1.7 \quad [6]$$

where f is the focal distance of the entire imaging lens, f1 is the focal distance of the first lens, and TL is the distance from the object side of the iris to an imaging surface.

The imaging lens according to the present invention is configured to form one surface of the third lens and the object side surface of the fourth lens in a spherical shape, so that the sensitivity of the lens is decreased and the assembly efficiency of the lens is improved, and thus the yield of the imaging lens can be improved.

The preferred construction is suitably employed according to the circumstances, and thus a lens system having high performance and compactness can be implemented.

Hereinafter, an embodiment of the present invention will be described in detail below with reference to the drawing.

Further, in the following description, when the power of respective lenses or the convexity/concavity of respective lens surfaces is described, it is assumed that respective lenses are arranged on the optical axis in principle.

The imaging lens shown in the embodiment of FIG. 1 is an imaging lens, which sequentially includes an iris 2, a first lens L1, a second lens L2, a third lens L3, and a fourth lens L4 in the direction from an object side to an image side, and which is configured to focus light rays, incident thereon along the optical axis, onto the image formation location of an imaging device 3 (imaging surface) with high efficiency.

In this case, the iris 2 is arranged on the object side surface of the first lens L1, and a cover glass 1 is interposed between the imaging lens and the imaging device 3.

Further, the first lens L1 is a positive lens having positive refractive power, and the second lens L2 is a negative lens having negative refractive power.

In the present invention, the third lens L3 is a positive lens having positive refractive power and having at least one surface formed in an aspherical shape.

In an embodiment of the present invention, the image side surface of the third lens L3 is preferably formed in an aspherical shape, and the object side surface of the third lens L3, having high sensitivity, is preferably formed in a spherical shape.

Further, the fourth lens L4 is a negative lens having negative refractive power, and is configured such that the image side surface thereof is formed in an aspherical shape and the object side surface thereof is formed in a spherical shape.

The imaging lens of the present invention, including the first lens L1 to the fourth lens L4, satisfies the following conditional expressions, $$(r3+r4)/(r3-r4)>-0.7 \quad [1]$$

$$v1-v2>15.0 \quad [2]$$

$$v3-v2>15.0 \quad [3]$$

where r3 is the radius of curvature of the object side surface of the second lens, r4 is the radius of curvature of the image side surface of the second lens, and v1, v2 and v3 are Abbe constants of the first, second and third lenses, respectively.

Further, the imaging lens according to the present invention is configured to satisfy the following conditional expression, $$0>R_{3R}>R_{4F} \quad [4]$$

where $R_{3R}$ is the radius of curvature at the center of the image side surface of the third lens, and $R_{4F}$ is the radius of curvature at the center of the object side surface of the fourth lens.

Further, the imaging lens is configured to satisfy the following conditional expression [5] for the power of the first lens, and to satisfy the following conditional expression [6] for the dimensions of the entire lens along an optical axis, $$0<f1/f<0.8 \quad [5]$$

$$TL/f<1.7 \quad [6]$$

where f is the focal distance of the entire imaging lens, f1 is the focal distance of the first lens, and TL is the distance from the object side of the iris to the imaging surface.

The operation and effects of the embodiment of the present invention are described below.

The third lens L3 has one surface formed in an aspherical shape and the other surface formed in a spherical shape, so that there are advantages in that respective aberrations, including the curvature of an image field or spherical aberrations, are suitably corrected because the aspherical surface is used, and in that the assembly efficiency of the lens can be improved because one surface having higher sensitivity is formed as a spherical surface.

Further, the fourth lens L4 is advantageous in that, since the image side surface thereof is formed in an aspherical shape and the object side surface thereof is formed in a spherical shape, sensitivity is decreased and assembly efficiency is improved, and thus the yield of the imaging lens can be enhanced.

The above-described imaging lens according to the present invention can be modified in various forms. For example, the radiuses of curvature of respective lenses, intervals between respective lenses (or lens thicknesses), and the shapes of aspherical surfaces may be suitably changed.

Further, respective lenses may be made of plastic material as the material thereof, thus reducing the costs of the lens.

As described above, the present invention provides an imaging lens, which is configured such that at least one surface of a third lens is formed in an aspherical shape, the image side surface of a fourth lens is formed in an aspherical shape, and the object side surface of the fourth lens is formed in a spherical shape, and such that the imaging lens satisfies predetermined conditional expressions [1] to [6], thus optimizing the shapes and power distribution of respective lenses. Accordingly, the imaging lens is advantageous in that aspherical surfaces can be effectively used using a small number of lenses, and the surface of a lens in a highly sensitive portion is formed as a spherical surface, rather than an aspherical surface, thus making it easier to produce an imaging lens through the improvement of the assembly efficiency thereof, and enhancing the yield of the imaging lens.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An imaging lens, comprising:
    an iris, a first lens, a second lens, a third lens, and fourth lens sequentially arranged in a direction from an object side,
    wherein the first lens is a positive lens having positive refractive power,
    wherein the second lens is a negative lens having negative refractive power,
    wherein the third lens is a positive lens, which has at least one surface formed in an aspherical shape and has positive refractive power, and
    wherein the fourth lens is a negative lens, which has an image side surface formed in an aspherical shape and an object side surface formed in a spherical shape, and has negative refractive power, and
    wherein the imaging lens is configured to satisfy the following conditional expressions:

$$(r3+r4)/(r3-r4) > -0.7 \quad [1]$$

$$v1 - v2 > 15.0 \quad [2]$$

$$v3 - v2 > 15.0 \quad [3]$$

$$0 > R_{3R} > R_{4F} \quad [4]$$

where r3 is a radius of curvature of an object side surface of the second lens, r4 is a radius of curvature of an image side surface of the second lens, v1, v2 and v3 are Abbe constants of the first, second and third lenses, respectively, $R_{3R}$ is a radius of curvature at a center of an image side surface of the third lens, and $R_{4F}$ is a radius of curvature at a center of an object side surface of the fourth lens.

2. The imaging lens according to claim 1, wherein the imaging lens is configured to satisfy the following conditional expression [5] for power of the first lens and to satisfy the following conditional expression [6] for dimensions of an entire imaging lens along an optical axis, $$0 < f1/f < 0.8 \quad [5]$$

$$TL/f < 1.7 \quad [6]$$

where f is a focal distance of the entire imaging lens, f1 is a focal distance of the first lens, and TL is a distance from an object side of the iris to an imaging surface.

* * * * *